United States Patent [19]
Stephenson, Jr.

[11] Patent Number: 5,186,586
[45] Date of Patent: Feb. 16, 1993

[54] REMOTE RELEASE DEVICE FOR LOAD BINDERS

[75] Inventor: Everett H. Stephenson, Jr., Savannah, Ga.

[73] Assignee: Union Camp Corporation, Wayne, N.J.

[21] Appl. No.: 898,784

[22] Filed: Jun. 11, 1992

Related U.S. Application Data

[62] Division of Ser. No. 661,923, Feb. 26, 1991, Pat. No. 5,145,299.

[51] Int. Cl.$^5$ .................................................. B60P 7/08
[52] U.S. Cl. ........................................ 410/100; 410/103; 24/265 CD; 254/217; 242/86.52
[58] Field of Search ...................... 410/34, 38, 96, 97, 410/100, 101, 103, 156; 24/68 CD, 71.2, 265 CD; 254/213, 217; 242/86.5 R, 86.52

[56] References Cited

U.S. PATENT DOCUMENTS

| | | | |
|---|---|---|---|
| 2,738,204 | 3/1956 | Ibey | 410/103 X |
| 2,992,750 | 7/1961 | Brock | 410/100 X |
| 3,428,331 | 2/1969 | Morgan et al. | 410/100 |
| 4,174,119 | 11/1979 | Biles | 410/103 |
| 4,382,736 | 5/1983 | Thomas | 410/100 X |
| 4,399,954 | 8/1983 | Arrant | 242/86.52 |
| 4,955,092 | 9/1990 | Hagan | 242/86.52 X |

*Primary Examiner*—Michael S. Huppert
*Assistant Examiner*—James T. Eller, Jr.
*Attorney, Agent, or Firm*—William K. Wissing

[57] ABSTRACT

A remote release mechanism is disclosed which permits restraints such as flat straps placed around a load and placed in tension by a winch to be released by an operator positioned on the same side of the transportation structure as the winch. Thus, the present invention permits the hook end of a load restraint to be released from the winch side of the transportation structure, thereby eliminating the need to perform separate operations on either side of the restraint mechanism. In a preferred embodiment, the present invention provides apparatus comprising a hook bar connected to a rotatable drum which is held from rotation in one direction by a ratchet and pawl. Upon release by the application of force to a remote release rod, the hook bar is released and permitted to rotate, thereby causing the hook which connects the restraint to the hook bar to fall away, releasing the restraint. Methods of remotely releasing a load restraint are also disclosed.

4 Claims, 2 Drawing Sheets

REMOTE RELEASE DEVICE FOR LOAD BINDERS

This is a division, of application Ser. No. 661,923, filed Feb. 26, 1991now U.S. Pat. No. 5,745,299.

This invention is related to my previously filed U.S. patent application Ser. No. 656,932, filed on Feb. 15, 1991 and entitled "CONSTANT TENSION WINCH HAVING ANTI-THEFT MECHANISM".

The present invention relates to methods and apparatus for restraining a load and, more particularly, to apparatus for remotely releasing a restraint, e.g., a strap that is restraining a load.

BACKGROUND OF THE INVENTION

The transportation of goods via railcar, flatbed truck or flat barge frequently involves the use of cables, chains or straps placed in tension over the load. As set forth in my previous patent application, referenced above, there are a number of considerations, well known to those of ordinary skill, that impact upon the effective design of winches, straps and the other hardware inherent in such load restraint systems. However, despite the advances in winches set forth in my previous patent application, the design disclosed therein as well as most other known designs suffer from an inability to be quickly and efficiently released upon arrival of the load at its destination.

For example, when logs are shipped via railcar, the load is typically restrained by three or six winch-driven straps which encircle the log stacks. Upon arrival, woodyard personnel must remove these load binders from each car prior to unloading. This type of operation is extremely slow and cumbersome when handled by one person. This is because the railcars typically arrive at the unloading point randomly oriented, with the winches randomly located on either side of the railcars. For this reason, two people are typically assigned this task, one standing on each side of the rails by which the railcars to be unloaded arrive. The two unloading personnel must work together to release the tension created by the winch mechanisms, release the strap or cable end, pull the restraint over the load and store the released restraint. If only one person is assigned these sequential tasks, two, three or more complete circuits must be performed around a line of railcars. If some of the strap ends are accidentally left engaged, the restraint mechanism will be destroyed by the force created when the unloading crane lifts the load. Even if all the straps are properly disengaged and removed from the load bundle, some may be improperly stored since the unloading operations frequently take place at night or in the dimly lit corridors between lines of railcars. Binders that are improperly stored are likely to trail behind the railcar, being either damaged or severed entirely. In some instances, the binder may damage other equipment or even cause derailment.

Therefore, it would be desirable to provide a load binder for use in conjunction with a winch mechanism that could be operated and released conveniently by one person who is preferably located in the vicinity of the winch.

SUMMARY OF THE INVENTION

Accordingly, it has now been found that these and other objectives may be fulfilled when using a load restraint comprising a strap and hook that surrounds the load, by providing release apparatus comprising a housing having an attached rotatable drum with a hook bar for receiving a hook in releasable engagement where a ratchet selectively prevents the rotation of the drum in one direction, and a release means is provided that permits the ratchet to be released from a remote location. Thus, when the release means is operated after the strap tension has been released at the winch device, the drum is permitted to rotate in either of two directions, and due to the weight of the hook and hook bar, the drum rotates so as to cause the hook bar to be angularly displaced and the hook released therefrom. In a preferred embodiment, the ratchet comprises a ratchet wheel with at least one tooth and a pawl. The pawl is preferably connected to the release means by a connecting rod, and in a preferred embodiment a spring means for urging the pawl into the ratchet tooth is also provided. In a most preferred embodiment of the present invention, the restraint comprises a flat strap which is terminated at its distal end by a hook which is substantially in the shape of a bent, flat plate. Similarly, the hook bar is most preferably plate-shaped so as to engage the preferred embodiment of the hook. In certain embodiments, a means is provided whereby a tool for producing a torque may be accepted by the release means. For example, a hole may be provided in the drum or one end of the drum may be shaped to accept a wrench or similar tool. In a most preferred embodiment, the apparatus of the present invention is affixed to a railcar and cooperates with a constant tension winch disposed laterally opposite the release mechanism on the structure of the railcar. Methods of releasing a restraint placed around a load from a remote location adjacent a winch which tensions the restraint on the load are also disclosed.

DETAILED DESCRIPTION OF THE PREFERRED EMBODIMENTS

As mentioned above, the present invention is preferably used in conjunction with a winch that creates tension in a load restraint, such as a strap. Most preferably, the present invention is used in conjunction with a constant tension winch apparatus, such as that disclosed in my previously filed U.S. patent application Ser. No. 656,932, filed on Feb. 15, 1991 (Attorney Docket UCC-744), entitled "CONSTANT TENSION WINCH HAVING AN ANTI-THEFT MECHANISM". Although the descriptions which follow relate mainly to the use of the aforementioned winch and the application of the present invention on a railcar, those of ordinary skill will realize that numerous other transportation devices, such as flatbed trucks and large shipping pallets lend themselves to application of the present invention.

Figure 1:
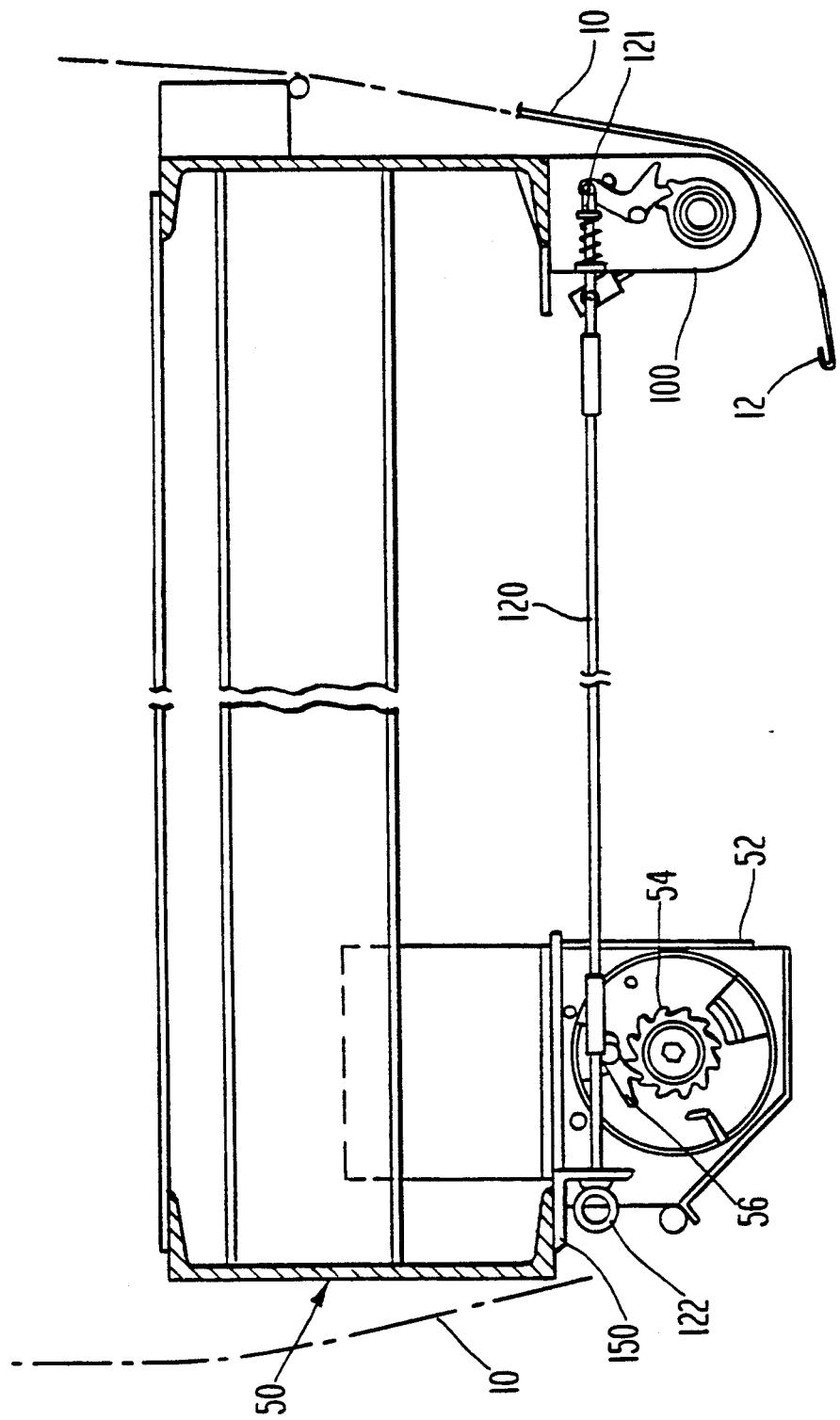
FIG. 1 is a side elevation view of the remote release mechanism of the present invention installed to cooperate with a winch.

Referring now to FIG. 1, there is shown in elevation view a typical installation of a preferred embodiment of apparatus 100 of the present invention. A transportation structure 50, such as a railcar, shown partially in cross-section, is fitted with a winch 52 having a strap 10 extending therefrom and over the load (not illustrated). In a most preferred embodiment illustrated in FIG. 1, the apparatus of the present invention is used in conjunction with a constant tension winch 52 that is operated by at least a first ratchet 54 and pawl 56 to provide tension in the strap, cable, chain or other load restraint 10. Those of ordinary skill are familiar with the operation of such winches generally and further details the operation of a constant tension winch 52 such as that shown in FIG. I are set forth in my above-referenced patent application.

As shown by the phantom lines in FIG. 1, the load restraint 10 is guided upward and over the load to be restrained until it encircles the load and is brought to a position where it may again be attached to the transportation structure 50. For this purpose, the distal end of the strap 10 is preferably fitted with a hook 12 or similar engaging means for removable attachment. Most preferably, at least a portion of the hook 12 is formed of a flat plate, rather than having a circular cross-section or other shape. As shown in FIG. 1, the strap 10 is routed beneath the release mechanism 100 of the present invention. As explained in detail below, the hook 12 is then engaged with the release mechanism 100, thereby permitting the strap or other restraint 10 to be placed in tension by the operation of the winch 52.

The remote release feature of the present invention is also shown in FIG. 1. A release rod 120 is connected at a first end 121 to and extends from the release mechanism 100 transversely beneath the transportation structure 50. The release rod 120 is mounted adjacent the winch 52 using a mounting bracket 150. As illustrated, an eye bolt 122 or other means for grasping and manipulating the release rod 120 is preferably provided at its second end. By providing the release rod 120 as shown, the present invention obviates the need for personnel to be positioned on alternate sides of the car, or for personnel to make multiple circuits around the cars to release the restraints. Although the release rod 120 is preferably comprised of round hot rolled steel bar stock, a hollow tube, cable, chain or the like could be substituted to perform its function. Similarly, those of ordinary skill will immediately realize that numerous other structures could be substituted for the eye bolt 122 illustrated. For example, a "T" handle, square ring, "L" handle or the like would perform equally well to operate the release mechanism 100 in certain applications of the present invention.

Further details of the release mechanism 100 are best described with reference to FIG. 2, wherein a preferred embodiment of the release mechanism 100 of the present invention is illustrated in an elevation side view. As shown, the restraint 10 is first guided over a chafe preventing means 102 which may be a circular bar, as illustrated, or other means for permitting the restraint to slide smoothly, e.g., a formed bracket or other radiused structure. Since the strap 10 is now within the housing 110 of the release mechanism 100, it is shown in phantom as it passes over the drum 104 which is rotatably attached to the housing 110. Affixed to the drum 104 and also shown in phantom is the hook bar 106. As its name implies, the hook bar provides a location where the hook 12, preferably provided at the distal end of the strap 10, may be releasably engaged with the release mechanism 100. At least a portion of the hook bar 106 is most preferably in the form of a flat plate, as is the hook 12, for reasons explained below. However, those of ordinary skill will realize that in certain applications it may be preferable to construct the hook bar 106 from a "U" shaped section of round bar stock or the like or to utilize other structures that perform the same function.

Preferably, the hook bar 106 has "ears" 107 either removably or fixedly attached to each side, thereby forming a guide device whereby the hook 12 is prevented from sliding to either side. It will be appreciated by one skilled in the art that while "ears" are illustrated in FIG. 2 and FIG. 3, other means for providing such a guide device are anticipated to fall within the scope of the present invention.

Also affixed to the drum 104, but disposed on the outside of the structure is the ratchet 108. As illustrated, the ratchet 108 is comprised of one or more ratchet teeth 109. In certain embodiments, it may in fact be preferable to provide a single ratchet tooth 109. In any event, at least one ratchet tooth engages the pawl 112 to prevent the rotation of the drum 104 in one direction. Thus, for the embodiment illustrated in FIG. 2, the drum 104 may be rotated only in the clockwise direction, and slippage in the counterclockwise direction is prevented by the engagement of the pawl 112 and one of the ratchet teeth 109.

The pawl 112 pivots on a pawl pin 113, which pin is preferably a shoulder stud extending through a drill hole in housing 110, and plug-welded on the opposite side thereof, pawl pin 113 further functions as a means for attaching the pawl 112 to the housing 110. The pawl pin 113 may alternatively be comprised of a stud and a cotter pin or clip, a nut and bolt, or any one of numerous other similar structures well known to those of ordinary skill.

Connected to the pawl 112 is the connecting rod 114 which is connected at a first end by pin joint 115 to the pawl 112 and is connected to the release bar 120 at its second end. The connecting rod 114 is slidably affixed to the housing 110 via a connecting rod bracket 111. A coil spring 116 is compressed between a spring stop 117 formed on the connecting rod 114 and the connecting rod bracket 111. The force created by the displacement of the coil spring urges against the spring stop 117 and thereby urges the pawl into firm engagement with a ratchet tooth 109, preventing inadvertent disengagement due to shock or vibration.

Figure 2:
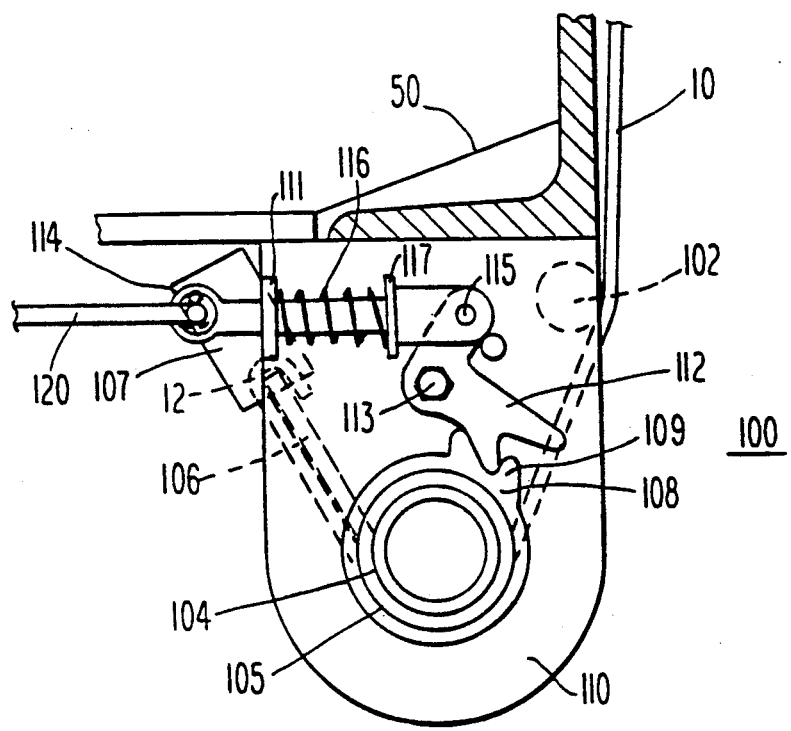
FIG. 2 is a side elevation view of a portion of the remote release mechanism shown in FIG. 1, illustrating the engagement of a strap and hook.
Figure 3:
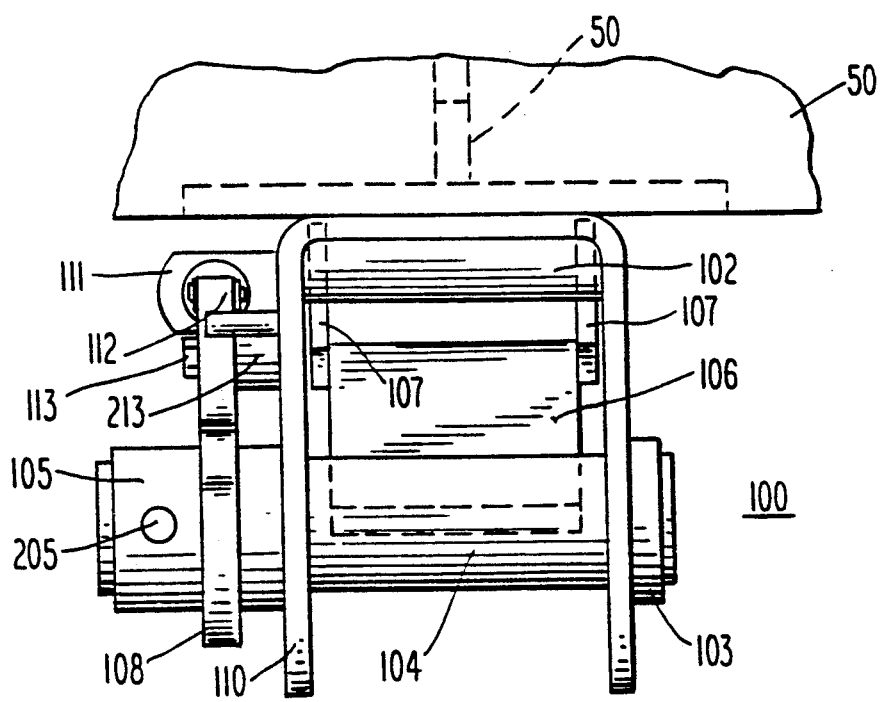
FIG. 3 is a front elevation view of the remote release mechanism shown in FIG. 2.

Referring now to FIG. 3, there is illustrated a front elevation view of the release mechanism illustrated in FIG. 2, revealing further details of the apparatus described immediately above. In FIG. 3, the strap 10 or other restraint is omitted to permit a clear view of the hook bar 106. Also shown is the drum 104 and the manner in which it is mounted within the housing 110. The ends of the drum which protrude through the housing 110 are most preferably retained by a drum retaining ring 103 and a drum sleeve 105 which are hollow, tubular members having about the same inner diameter as the outer diameter of the drum 104, thereby permitting them to be press fit, shrink fit, swaged, welded or otherwise affixed to the drum 104. Alternatively, the drum ring 103 and drum sleeve 105 could be affixed using a set screw or the like that urges against the drum. As shown, a boss 213 aligns the pawl 112 and the ratchet wheel 108. Also provided in a preferred embodiment and illustrated in FIG. 3 is a hole 205 or other means for receiving torque, such as that generated by a shaft or bar (not illustrated) inserted in the hole 205. This feature permits the advancement of the drum in the single direction permitted by the operation of the ratchet and pawl, as discussed above if so desired to increase the tension in the restraint. In certain other embodiments, the hole 205 could be replaced by a square, hexagonal or other sectioned shape formed in the sleeve 205 that permits a wrench or the like to be engaged therewith.

The present invention also discloses means for releasing a load restraint. In operation, the load is secured by engaging the restrain 10 in the manner illustrated in FIGS. 1-2. Most preferably, the hook bar 106 is positioned about 60° from the horizontal when the pawl 112 is engaged with a ratchet tooth 109. The strap 10 is tensioned using the winch 52, however minor adjustment using the release mechanism 100 is possible in certain embodiments. To remotely release the hook 12 and thus free the restraint 10, an operator merely pulls the eye bolt 122 provided on the release rod 120, using either a manual grip or with the aid of a lever or tool (not shown). The pull on the release rod 120 is transferred to the pawl 112 via the connecting rod 114. The spring 116 is chosen such that the force it creates to urge the pawl 112 into the ratchet tooth 109 is readily overcome by the operator. In other words, the application of a release force on the release rod 120 results in compressive displacement of the spring 116 by movement of the connecting rod 114.

Since the pawl 112 is pivotably connected to the connecting rod 114 and the housing 110, upon movement of the connecting rod 114, it will swing to disengage from the ratchet tooth 109. When this occurs, the weight of the hook and hook bar, plus any tension in the restraint 10 will cause the drum to rotate in the counterclockwise direction (relative to the view illustrated in FIG. 2), causing the hook 12 to disengage the hook bar 106. At this point, the winch may be manually wound to stow the restraint 10. Alternatively, should the operator be on the side of the railcar or other transportation structure where the release mechanism 100 is mounted, the pawl 112 may be manually lifted to disengage the ratchet tooth 109 and permit the drum 104 to turn freely, thereby releasing the restraint 10 as described above. In this instance, unless the winch 52 provided is self winding, the strap must be manually reeled in and stowed from the opposite side of the railcar or other transportation structure.

Although certain embodiments of the present invention have been described above with particularity, numerous modifications, substitutions and variations to the embodiments disclosed will immediately present themselves to those of ordinary skill. As mentioned above, a number of structural elements described above could be readily exchanged with others which, although differing in appearance, perform the same function to achieve the same result. Moreover many elements illustrated could be combined if desired or otherwise differently adapted to be used on different transportation structures. However, such alternate embodiments are intended to be within the spirit of this invention. Accordingly, reference should be made to the appended claims to ascertain the full scope of the present invention.

What is claimed is:

1. Remote release apparatus for releasing a load restraint comprising an elongated flexible restraint member having a hook at a free end thereof, the restraint being placed in tension by a winch and surrounding a load on a load supporting body, said apparatus comprising:

a housing;

a drum rotatably mounted within said housing, said drum having two ends, at least a portion of each end extending through said housing;

a hook bar for receiving the hook in releasable engagement, said hook bar affixed to said drum and disposed within said housing;

at least one ratchet tooth affixed to a first end of said drum;

a pawl pivotably affixed to said housing in a position to engage said at least one ratchet tooth;

a connecting rod pivotably attached to said pawl;

a spring means for urging said pawl into engagement with said ratchet tooth; and a release bar slidably connected to said pawl disengaging said pawl from said ratchet tooth, whereby said ratchet tooth and said pawl may be selectively engaged to prevent rotation of said drum in one direction and disengaged to permit rotation in two directions and thereby release said hook from engagement with said hook bar.

2. The apparatus of claim 1, wherein said ratchet tooth is remotely disengaged by the application of a force to said release bar.

3. The apparatus of claim 1, wherein said spring is disposed so as to resist the axial displacement of said release bar.

4. The apparatus of claim 3 wherein said spring is disposed between a spring stop and a portion of said housing, whereby upon application of a force to the release bar to release the pawl from the ratchet tooth, the spring is compressed.

* * * * *